US009563763B1

(12) United States Patent
Roth et al.

(10) Patent No.: US 9,563,763 B1
(45) Date of Patent: Feb. 7, 2017

(54) ENHANCED CAPTCHAS

(71) Applicant: Amazon Technologies, Inc., Seattle, WA (US)

(72) Inventors: Gregory Branchek Roth, Seattle, WA (US); Jeffrey John Wierer, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 13/899,146

(22) Filed: May 21, 2013

(51) Int. Cl.
*G06F 21/00* (2013.01)
*G06F 21/36* (2013.01)
*G06F 21/30* (2013.01)

(52) U.S. Cl.
CPC .............. *G06F 21/36* (2013.01); *G06F 21/30* (2013.01)

(58) Field of Classification Search
CPC .................................. G06F 21/30; G06F 21/36
See application file for complete search history.

(56) References Cited

U.S. PATENT DOCUMENTS

| 8,671,058 | B1* | 3/2014 | Isaacs | 705/50 |
| 2006/0287963 | A1* | 12/2006 | Steeves et al. | 705/64 |
| 2011/0225634 | A1 | 9/2011 | Pai | |
| 2013/0191641 | A1* | 7/2013 | Pai | 713/176 |

* cited by examiner

*Primary Examiner* — Kendall Dolly
(74) *Attorney, Agent, or Firm* — Lee & Hayes, PLLC

(57) ABSTRACT

Concepts and technologies are described herein for providing enhanced Completely Automated Public Turing tests to Tell Computers and Humans Apart ("CAPTCHAs"). According to some of the concepts and technologies disclosed herein, a CAPTCHA service may be configured to generate CAPTCHAs enhanced with watermarks and/or other enhancements. The CAPTCHA service may provide the enhanced CAPTCHAs to user services, such as Websites, Web services, and other services that utilize or are capable of utilizing CAPTCHAs as a security feature. The watermarks and/or other enhancements may contain information associated with users of the user services so that the enhanced CAPTCHAs are more difficult to break by unauthorized entities, including automated programs such as "bots." According to other concepts and technologies disclosed herein, a CAPTCHA breaking service is provided.

31 Claims, 6 Drawing Sheets

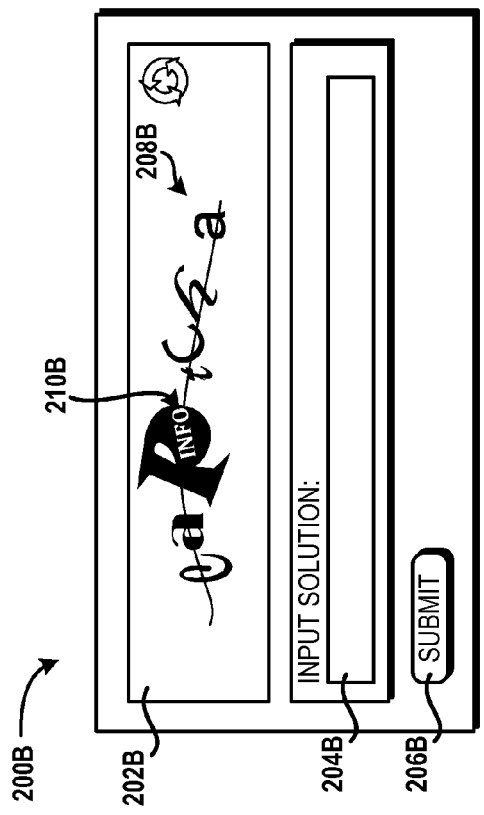
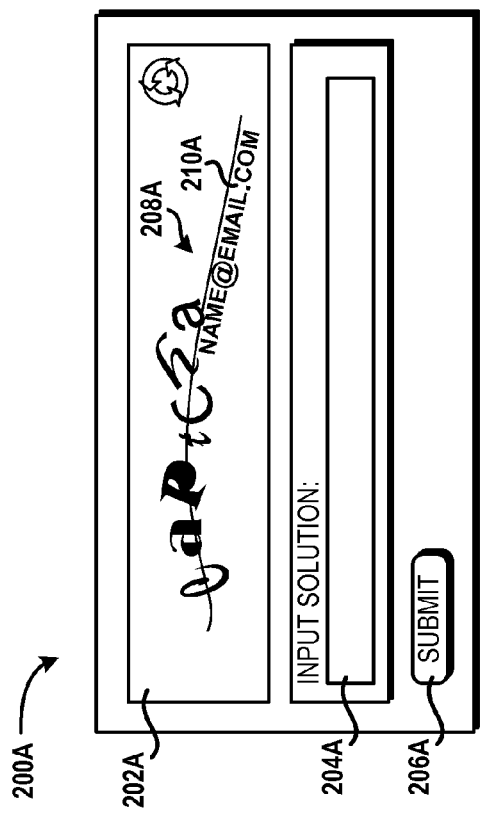
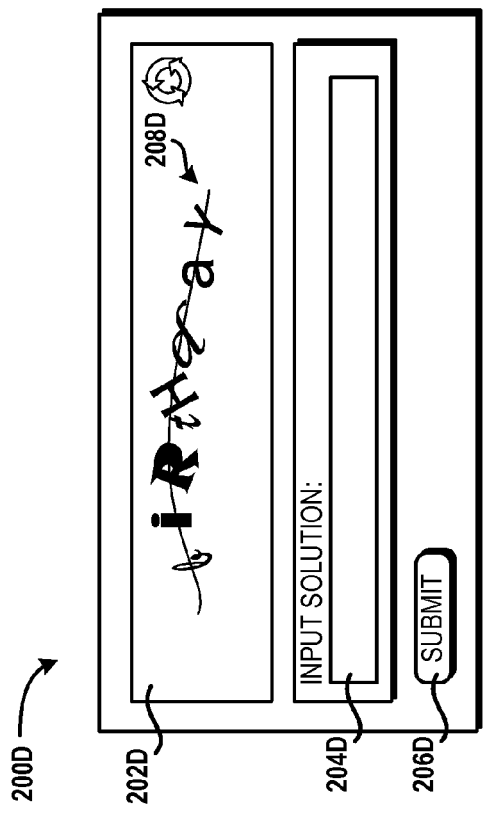
FIG. 2A  FIG. 2B  FIG. 2C  FIG. 2D

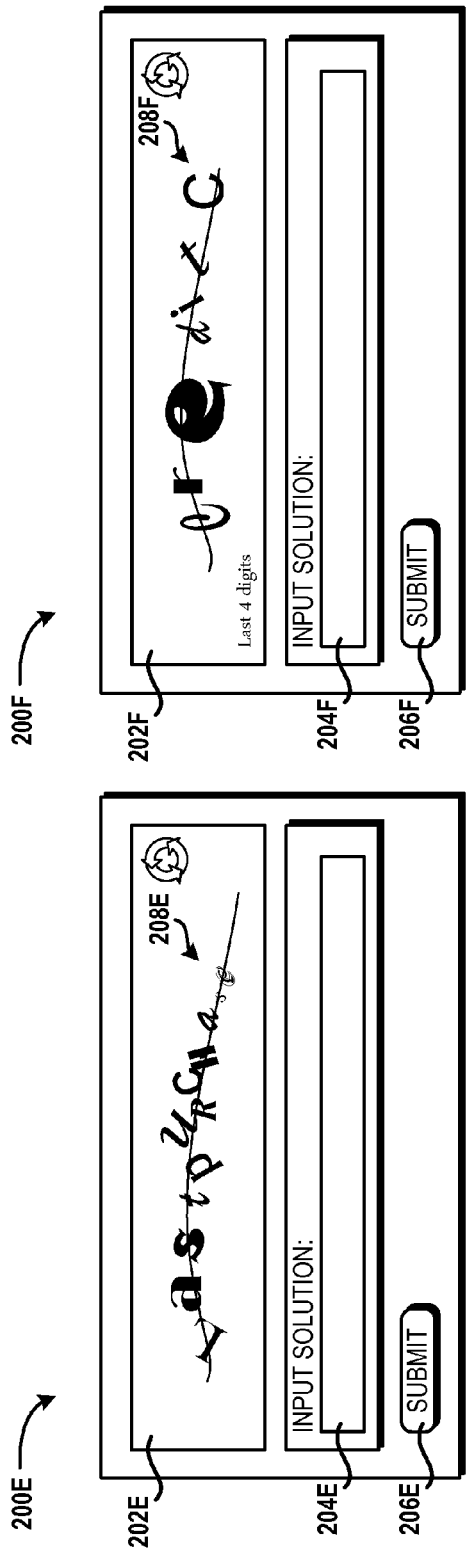
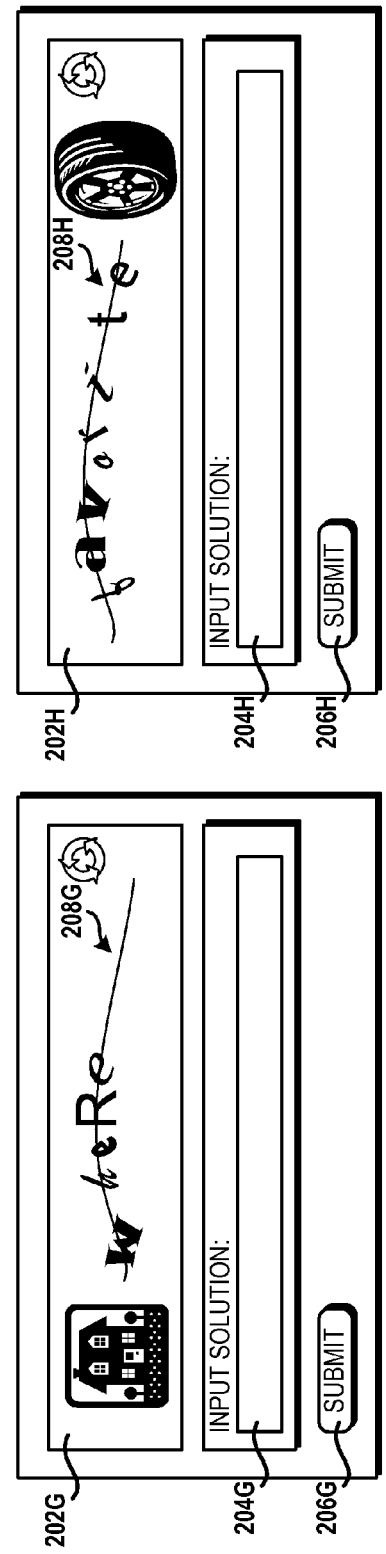
FIG. 2E FIG. 2F FIG. 2G FIG. 2H

ENHANCED CAPTCHAS

BACKGROUND

A Completely Automated Public Turing test to Tell Computers and Humans Apart ("CAPTCHA") is a challenge-response test used in computing to verify that a response is provided by a human being rather than a computer. CAPTCHAs typically include one or more characters that have been distorted in some manner so as to make it difficult or in some cases impossible for a computer to provide the correct response. Common forms of distortion include introducing noise, creating a distorted background, warping characters, waving characters, crowding characters, and using strikethrough lines.

Websites often use CAPTCHAs as a layer of security to prevent potentially malicious activity from automated programs, such as "bots." For example, an automated program may be configured to add spam, such as unwanted advertisements, to a Website, or provide false information into online forms. Other automated programs may force repeated requests to servers that may cause the servers to slow down or even fail, for example.

CAPTCHAs are becoming increasingly more difficult for human beings to solve. This is at least in part due to advancements in artificial intelligence that have made it possible for computers to solve CAPTCHAs that rely on simple distortion techniques such as those described above. In an effort to reduce the solvability of CAPTCHAs, the techniques used to obscure characters for CAPTCHAs are becoming increasingly more complex, often to the point of being unreadable or marginally-readable by human beings. This may frustrate users and may even deter some users from using a Website or service that utilizes CAPTCHAs.

It is with respect to these and other considerations that the disclosure made herein is presented.

BRIEF DESCRIPTION OF THE DRAWINGS

FIGS. 2A-2H are user interface diagrams of several illustrative examples of enhanced CAPTCHAs;

DETAILED DESCRIPTION

The following detailed description is directed to generating and providing enhanced CAPTCHAs. According to some of the concepts and technologies disclosed herein, a CAPTCHA service may be configured to generate CAPTCHAs enhanced with watermarks and/or other enhancements. The CAPTCHA service may provide the enhanced CAPTCHAs to user services, such as Websites, Web services, and other services that utilize or are capable of utilizing CAPTCHAs as a security feature. The watermarks and/or other enhancements may contain information associated with users of the user services so that the enhanced CAPTCHAs are more difficult to solve or "break" by unauthorized entities, including automated programs such as "bots." According to other concepts and technologies disclosed herein, a CAPTCHA breaking service is provided.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-book readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
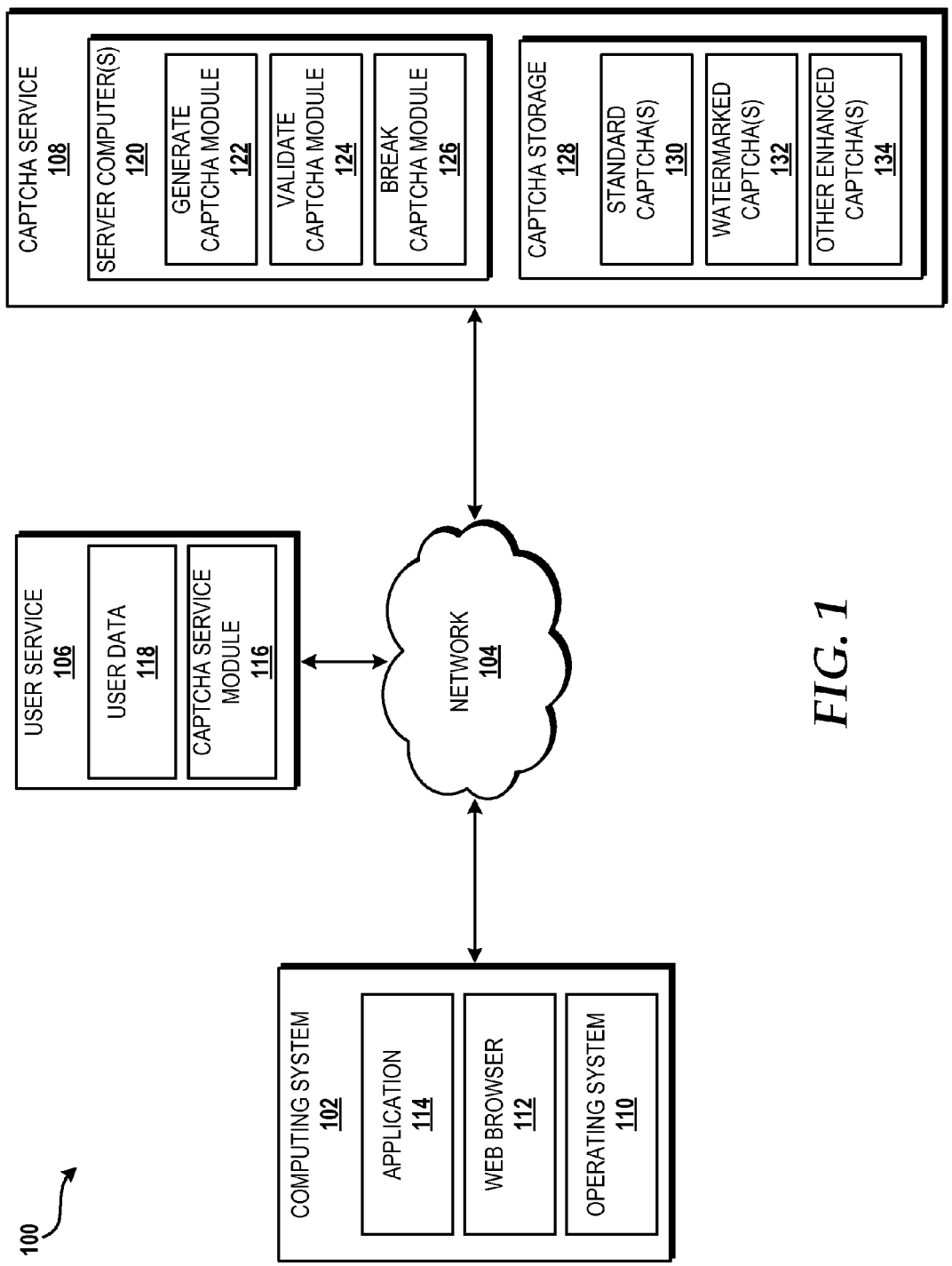
FIG. 1 is a system diagram showing an illustrative operating environment for the various embodiments disclosed herein.

FIG. 1 and the following description are intended to provide a brief, general description of a suitable computing environment in which the embodiments described herein may be implemented. In particular, FIG. 1 is a system and network diagram that shows an illustrative operating environment 100 including several hardware and software components for generating and providing enhanced CAPTCHAs, and breaking standard and enhanced CAPTCHAs. The operating environment 100 is merely illustrative and the embodiments disclosed herein might be utilized in many different types of environments.

The operating environment 100 shown in FIG. 1 includes a computing system 102 operating as a part of and/or in communication with a network 104. According to various implementations of the concepts and technologies disclosed herein, the computing system 102 can include a user computing device, such as a tablet computing device, a personal computer ("PC"), a desktop computer, a laptop computer, a notebook computer, a cellular phone or smartphone, other mobile computing devices, a personal digital assistant ("PDA"), or the like. An example architecture that may be used to implement the computing system 102 is illustrated and described below with reference to FIG. 5.

According to some other embodiments, the functionality of the computing system 102 can be provided, at least in part, by a cloud-based computing platform that can be provided by one or more application servers, Web servers, data storage systems, network appliances, dedicated hardware devices, and/or other server computers or computing devices. For purposes of illustrating and describing the concepts and technologies disclosed herein, the functionality of the computing system 102 is described herein as being provided by a user computing device. In light of the alternative embodiments of the computing system 102 described above, it should be understood that this example is illustrative, and should not be construed as being limiting in any way.

The computing system 102 can communicate via the network 104 to access various services described herein. For example, the computing system 102 can access a user service 106 and a CAPTCHA service 108 via the network 104. The functionality of the user service 106 and the CAPTCHA service 108 can be provided by one or more application servers, Web servers, data storage systems, network appliances, dedicated hardware devices, and/or other server computers or computing devices.

The user service 106 can utilize the CAPTCHA service 108 to provide standard and/or enhanced CAPTCHAs as a security feature to eliminate or at least mitigate unwanted access to the user service 106, as will be described in greater detail below. In some embodiments, the user service 106 and the CAPTCHA service 108 are provided by or for the same entity, such as an e-commerce Website, an e-mail service, a distributed computing service, or any other service that utilizes or is capable of utilizing CAPTCHAs. The network 104 may be a local-area network ("LAN"), a wide-area network ("WAN"), the Internet, or any other networking topology known in the art that connects the computing system 102 to the user service 106 and the CAPTCHA service 108.

The computing system 102 can be configured to execute an operating system 110 and one or more application programs such as, for example, a Web browser application 112, a native application ("application") 114, and/or other application programs. The operating system 110 is a computer program for controlling the operation of the computing system 102. The application programs are executable programs configured to execute on top of the operating system 110 to provide various functionality described herein.

In particular, the Web browser 112 is a software application executing on the computing system 102 for retrieving, presenting, and traversing information resources. The Web browser 108 can provide the computing system 102 access to the user service 106, the CAPTCHA service 108, and/or other information resources through one or more uniform resource identifiers ("URIs").

The application 114 is a software application executing on the computing system 102 for accessing the user service 106. The application 114 may be a native software application configured to access the user service 106. Alternatively, the application 114 may be a hybrid software application configured to access the user service 106 via a Web component built-in to a native container of the application 114. A user can access the user service 106 and/or the CAPTCHA service 108 via the Web browser 112 and/or the application 114.

The user service 106 can include a CAPTCHA service module 116 through which to access the CAPTCHA service 108. The CAPTCHA service module 116 can include code for accessing the CAPTCHA service 108 via one or more application programming interfaces ("APIs") exposed by the CAPTCHA service 108. The CAPTCHA service module 116 can be coded in any programming language known to those skilled in the art. The CAPTCHA service module 116 may be utilized by a plug-in installed in the Web browser 112 to access features provided by the CAPTCHA service 108.

The user service 106 can also include user data 118 stored in one or more databases or other data structures on one or more physical storage components (not shown) such as, for example, hard drives, solid state drives, or tape drives. The user data 118 can include any data associated with one or more users of the user service 106. The user data 118 may be associated with user accounts or may be standalone data. The user data 118 might include one or more usernames, passwords, personal identification numbers, other authentication credentials, social security numbers, e-mail addresses, physical addresses, user account histories, user purchase histories (e.g., for implementations in which the user service 106 is an e-commerce Website), user device information (e.g., MAC address and/or IP address of the computing system 102 and/or other computing systems), other data associated with one or more users, other data associated with the computing system 102, other data associated with other computing systems, combinations thereof, and the like. The user service 106 can provide at least a portion of the user data 118 to the CAPTCHA service 108 for use by the CAPTCHA service 108 in generating enhanced CAPTCHAs, as will be described below in detail.

Enhanced CAPTCHAs are CAPTCHAs that include one or more enhancements. An enhancement may be a watermark enhancement. An enhancement may be the character (s) of the CAPTCHA being generated based, at least partially, upon the user data 118. For example, an enhanced CAPTCHA may include characters that resemble or spell out a username, a user's e-mail address, or any of the user data 118. Alternatively, an enhanced CAPTCHA might directly or indirectly request a user to insert some personally identifiable information, such as their name, e-mail address, physical address, telephone number, the name of a product they recently purchased, the last four digits of their credit card number on file with the user service 106, or any other information that may be recognizable to a user but not recognizable (or at least less recognizable) to other entities, including other users, bots, and other automated systems that are attempting to solve or "break" the CAPTCHA.

An enhanced CAPTCHA that includes a watermark enhancement is referred to herein as a "watermarked CAPTCHA." A watermark enhancement may be visible or invisible. A visible watermark enhancement can at least partially overlay the characters of a CAPTCHA. A visible watermark enhancement can be presented above, below, or adjacent to a character string of a CAPTCHA or any of the individual characters of a CAPTCHA. A visible watermark enhancement additionally or alternatively can be embedded in one or more of the characters of a CAPTCHA.

An invisible watermark enhancement can insert a pattern of bits into the CAPTCHA to encode a message which can then be recovered using a recovery scheme. In some embodiments, the watermark message includes at least a portion of the user data 118 or other information associated with a user of the user service 106. Invisible watermarks can be inserted into CAPTCHAs in accordance with any known digital watermarking techniques and others not yet realized.

Some examples of enhanced CAPTCHAs that contain visible watermarks and other enhancements are illustrated and described with reference to FIG. 2. It should be understood that these examples are merely illustrative, and should not be construed as being limiting in any way.

The CAPTCHA service 108 can include one or more server computers 120 and/or other computing systems configured to execute one or more modules to generate, validate, and break standard CAPTCHAs, watermarked CAPTCHAs, other enhanced CAPTCHAs, or any combination thereof. In particular, the server computers 120 can execute a generate CAPTCHA module 122 to generate CAPTCHAs, including standard CAPTCHAs, watermarked CAPTCHAs, other enhanced CAPTCHAs, or any combination thereof. The server computers 120 can execute a validate CAPTCHA module 124 to validate CAPTCHA responses received from the user service 106 and/or other services (not shown) that utilize CAPTCHAs. The server computers 120 can execute a break CAPTCHA module 126 to "break" (i.e., solve) CAPTCHAs at the request of the user service 106 and/or other services (not shown) as will be described below in greater detail.

It should be understood that the generate CAPTCHA module 122, the validate CAPTCHA module 124, and the break CAPTCHA module 126 can be coded in any programming language known to those skilled in the art. It also should be understood that the generate CAPTCHA module 122, the validate CAPTCHA module 124, and the break CAPTCHA module 126 may execute on the same server computer 120 or on different server computers 120 which may be co-located or distributed.

The generate CAPTCHA module 122, in some embodiments, can create characters by random generation for use in creating CAPTCHAs. In some other embodiments, the generate CAPTCHA module 122 can utilize at least a portion of the user data 118 or other data received from the user service 106 or another service or computing system (e.g., the computing system 102) for use in creating CAPTCHAs. The generate CAPTCHA module 122 can apply any distortion or other techniques to distort or otherwise obscure the characters. It should be understood that the characters of a CAPTCHA may be provided without any distortion, and instead rely on the additional security features provided by watermarks and/or other enhancements for security. The generate CAPTCHA module 122 can also create visible and invisible watermarks and apply watermarks to CAPTCHAs.

CAPTCHAs generated by the generate CAPTCHA module 122 can be stored in a CAPTCHA storage component ("CAPTCHA storage") 128, which may be implemented using any number of storage devices such as, for example, hard disks, solid state drives, disk arrays, tape drives, combinations thereof, and the like. In the illustrated example, the CAPTCHA storage 128 stores one or more standard CAPTCHAs 130, one or more watermarked CAPTCHAs 132, and one or more other enhanced CAPTCHAs 134. The CAPTCHA storage 128 may store CAPTCHAs in association with one or more users identified by the user data 118. Although the CAPTCHA storage 128 is illustrated as being co-located with the server computers 120, the CAPTCHA storage 128 may be implemented remote from the server computers 120. Moreover, storage devices utilized by the CAPTCHA storage 128 may be co-located or distributed. In some embodiments, the CAPTCHA storage 128 is hosted by or for the user service 106, as an alternative to the illustrated embodiment.

The generate CAPTCHA module 122 can generate CAPTCHA solutions for use by the validate CAPTCHA module 124. CAPTCHA solutions may be stored along with or separate from corresponding CAPTCHAs in a table or other data structure within the CAPTCHA storage 128. CAPTCHA solutions may be hashed or protected by other security measures in accordance with any hashing or security technology to eliminate or at least mitigate unauthorized breaking of CAPTCHAs. In some embodiments, the generate CAPTCHA module 122 provides the CAPTCHA solutions for an enhanced CAPTCHA to the CAPTCHA service module 116 along with the enhanced CAPTCHA. The CAPTCHA service module 116 can then utilize the solutions at the appropriate time to determine if a received solution for a CAPTCHA is a correct solution.

In some embodiments, the generate CAPTCHA module 122 determines values for CAPTCHAs and assigns values to CAPTCHAs. The values may be monetary values or other values (e.g., points values or other proprietary values) that can be charged by the CAPTCHA service 108 to the user service 106 and/or other services for using the CAPTCHA generated by the CAPTCHA service 108. The CAPTCHA service 108, in some embodiments, keeps a portion (e.g., a percentage) of CAPTCHA values and gives another portion (e.g., another percentage) to the user service 106 if the user service 106 elects to have CAPTCHAs broken by the break CAPTCHA module 126, as will be described below in greater detail.

In some embodiments, CAPTCHAs generated by the CAPTCHA module 122 include associated metadata. The metadata might describe, for example, a link to a generated CAPTCHA along with the value associated with the CAPTCHA. The metadata might also provide other information intended for use by the break CAPTCHA module 126, described below, in generating a correct solution to a CAPTCHA. The metadata might also contain other types of information.

The validate CAPTCHA module 124 can be called by the user service 106, and more particularly, the CAPTCHA service module 116, to validate input (e.g., a character string) provided to the user service 106 in response to presentation of a CAPTCHA by the user service 106. The validate CAPTCHA module 124 can compare the input received from the user service 106 to a stored CAPTCHA solution to determine whether the input is correct. If so, the validate CAPTCHA module 124 can instruct the user service 106 to allow the user or other entity that provided the input to access the user service 106. If the input received from the user service 106 is incorrect, the validate CAPTCHA module 124 can instruct the user service 106 to deny the user or other entity that provided the input to access the user service 106.

The break CAPTCHA module 126 can provide a CAPTCHA breaking service to compliment the CAPTCHA generation service provided by the generate CAPTCHA module 122. For any number of reasons, the user service 106 may elect to allow a user or other entity, including a bot or other automated program, to access the user service 106 without having to provide the correct input for a CAPTCHA to obtain access to the user service 106. However, rather than removing the security layer provided by a CAPTCHA, the user service 106 can selectively allow the CAPTCHA to be broken. In particular, the user service 106 can call the break CAPTCHA module 126 to break a CAPTCHA, and in exchange, the CAPTCHA service 108 can provide the user service 106 with at least a portion of a value (e.g., a pre-defined percentage of the value) assigned to the CAPTCHA. In some embodiments, the break CAPTCHA module 126 provides an API through which a caller can obtain cost data (i.e. the cost to break the enhanced CAPTCHA) or other metadata associated with a particular enhanced CAPTCHA.

In this manner, the user service 106 can receive benefit from the security provided by a CAPTCHA to selectively allow access to the user service 106, and to selectively allow the CAPTCHA to be broken by the break CAPTCHA module 126 to allow users or other entities, including bots or other automated programs that might be unable to provide the correct response to solve the CAPTCHA, to access the user service 106, yet still receive some benefit in the form of at least a portion of the value for doing so.

In some embodiments, the CAPTCHA service module 116 or other component of the user service 106 is configured to implement calls to the break CAPTCHA module 126 based upon certain criteria to selectively allow breaking of CAPTCHAs. For example, the user service 106 may provide a search engine that from time-to-time receives multiple search queries in quick succession, which may be behavior indicative of an automated program configured to submit automated queries to the search engine with or without malicious intent.

In this example, the user service 106 might be configured to present a CAPTCHA in response to a pre-defined number of search queries within a specified period of time and may determine to allow the automated program to circumvent the CAPTCHA by calling the break CAPTCHA module 126 to break the CAPTCHA. In this manner, the user service 106 can receive some benefit—monetary or otherwise—in the form of at least a portion of the value associated with the CAPTCHA from allowing the automated program to continue to access the user service 106. The user service 106 may determine that the value is worth allowing the automated program to access the user service 106. It should be understood that the search engine example provided above is merely one example of a user service that could receive benefit from the selective CAPTCHA breaking service described herein, and should not be construed as being limiting in any way.

FIG. 1 illustrates one computing system 102, one network 104, one user service 106, one CAPTCHA service 108, one generate CAPTCHA module 122, one validate CAPTCHA module 124, one break CAPTCHA module 126, and one CAPTCHA storage component 128. It should be understood, however, that some implementations of the operating environment 100 can include computing systems 102, multiple networks 104, multiple user services 106, multiple CAPTCHA services 108, multiple generate CAPTCHA modules 122, multiple validate CAPTCHA modules 124, multiple break CAPTCHA modules 126, and multiple CAPTCHA storage components 128. As such, the illustrated embodiment of the operating environment 100 should be understood as being illustrative, and should not be construed as being limiting in any way.

It should be appreciated that the services provided by the generate CAPTCHA module 122, the validate CAPTCHA module 124, and/or the break CAPTCHA module 126 might be offered to various customers. For example, in one particular implementation, a first customer might utilize the generate CAPTCHA module 122 to generate a CAPTCHA in the manner presented herein. A second customer might utilize the break CAPTCHA module 126 to break the CAPTCHA generated for the first customer. The break CAPTCHA module 126 might also be configured to charge a fee to the second customer for breaking the CAPTCHA.

Turning now to FIGS. 2A-2H, user interface diagrams 200A-200H for several illustrative examples of enhanced CAPTCHAs will be described in detail. Each user interface diagram of the user interface diagrams 200A-200H includes a CAPTCHA element 202A-202H, an input element 204A-204H, a submit button 206A-206H, and an enhanced CAPTCHA 208A-208H. It should be understood that the user interfaces shown in the user interface diagrams 200A-200H may include additional or alternative user interface elements than will now be described. It also should be understood that the user interface diagrams 200A-200H may be designed with any number and combination of colors, patterns, gradients, shapes, sizes, and/or other visual elements. As such, the examples shown in FIGS. 2A-2H are illustrative, and should not be construed as being limiting in any way.

The input elements 204A-204H allow a user or other entity to provide a solution to the enhanced CAPTCHAs 208A-208H shown in the CAPTCHA elements 202A-202H. The submit buttons 206A-206H allow a user or other entity to submit the solution entered in the input elements 204A-204H. The CAPTCHA elements 202A-202H and the enhanced CAPTCHAs 208A-208H will now be described in greater detail.

The CAPTCHA elements 202A-202H are user interface elements configured to present one or more standard CAPTCHAs, watermarked CAPTCHAs, other enhanced CAPTCHAs, or combinations thereof. Although each of the CAPTCHA elements 202A-202H shows one CAPTCHA (i.e., one of the enhanced CAPTCHAs 208A-208H), it should be understood that the CAPTCHA elements 202A-202H may be configured to present two or more standard CAPTCHAs, watermarked CAPTCHAs, and/or other enhanced CAPTCHAs.

The illustrated CAPTCHA element 202A contains the enhanced CAPTCHA 208A, which is an enhanced CAPTCHA designed with a watermark enhancement 210A containing an e-mail address associated with a user. The illustrated CAPTCHA element 202B contains the enhanced CAPTCHA 208B, which is an enhanced CAPTCHA with a watermark enhancement 210B containing some personally identifiable information (shown as the word "INFO" embedded within the enhanced CAPTCHA 208B) associated with a user.

The illustrated CAPTCHA element 202C contains the enhanced CAPTCHA 208C, which is an enhanced CAPTCHA containing characters generated based upon a username associated with a user. In some embodiments, the enhanced CAPTCHA 208C is the username associated with a user. In some other embodiments, the enhanced CAPTCHA 208C indirectly requests that a user provide his or her username into the input element 204C as a solution for the enhanced CAPTCHA 208C. Likewise, the enhanced CAPTCHA 208D contained in the CAPTCHA element 202D may be generated based upon a birthday associated with a user and may be the birthday of the user or a request that the user provide his or her birthday into the input element 204D as a solution for the enhanced CAPTCHA 208D.

The inclusion of a user's email address, a user's username, or a user's birthday, as in the illustrated examples, or any other personally identifiable information in a watermarked CAPTCHA or other enhanced CAPTCHA can deter malicious activity by tying the challenge-response test provided by a particular CAPTCHA to a particular user. Moreover, a system used to break a CAPTCHA may be deterred from attempting to break a watermarked or other enhanced CAPTCHA that includes personally identifiable information. Such systems may include, for example, crowdsourcing marketplaces that compensate human beings for performing tasks (e.g., breaking CAPTCHAs) that require or are at least better-suited to human intelligence rather than artificial intelligence.

The inclusion of personally identifiable information in a watermarked CAPTCHA or other enhanced CAPTCHA can also improve readability by the user associated with the personally identifiable information. Because such a user is more likely to be able to identify their own personally identifiable information (i.e. their own e-mail address), this information might be distorted or otherwise modified in an enhanced CAPTCHA to a greater extent than non-personally identifiable information. By including user data in a visible portion of a CAPTCHA in this way, the difficulty of a CAPTCHA can be increased for an arbitrary user, while decreasing the difficulty of solving the CAPTCHA for the user that is associated with the personally identifiable information presented in the enhanced CAPTCHA. In this regard, the personally identifying information inserted into in a CAPTCHA might be selected such that a user knowing the personally identifying information is more likely to provide a correct solution to the CAPTCHA than a user that does not know the personally identifying information.

The watermark enhancements 210A, 210B shown in FIGS. 2A and 2B, respectively, are visible. Alternatively, the watermark enhancements 210A, 210B may be made invisible as described above. As an invisible watermark, the watermark enhancements 210A, 210B can embed personally identifiable information of a user into the CAPTCHAs 208A, 208B to prevent or at least deter the enhanced CAPTCHAs 208A, 208B from being broken by a CAPTCHA breaking service that does not have the correct solution.

In some embodiments, the watermark enhancements in an enhanced CAPTCHA are invisible and include encoded data that is intended for consumption by another service or component. For instance, in some embodiments an enhanced CAPTCHA might include an invisible watermark containing data for use by the break CAPTCHA module 126 or another component.

The CAPTCHA elements 202E-202H contain other enhanced CAPTCHAs. In particular, the CAPTCHA element 202E contains the enhanced CAPTCHA 208E, which is an enhanced CAPTCHA designed to indirectly ask a question regarding the last purchase made by a user. A bot or other automated program, for example, would attempt to decipher the words "LAST PURCHASE" and input that as the solution choice. The input of the words "LAST PURCHASE" into the input element 204E, however, would be incorrect and cause the user service 106 to deny the bot or other automated program access to the user service 106. The correct solution in this example would be the last purchase made by the user, not the words "LAST PURCHASE." The details regarding the last purchase may be derived from the user data 118 and may relate to a general product category, a specific product type, or a specific product name, for example.

The CAPTCHA element 202F contains the enhanced CAPTCHA 208F, which is an enhanced CAPTCHA designed to indirectly ask a question regarding the last four digits of a user's credit card. A bot or other automated program, for example, would attempt to decipher the words "LAST 4 DIGITS CREDIT C" and input that as the solution choice. The input "LAST 4 DIGITS CREDIT C" into the input element 204F, however, would be incorrect and cause the user service 106 to deny the bot or other automated program access to the user service 106. The correct solution in this example would be the last four digits of the user's credit card, not the words "LAST 4 DIGITS CREDIT C." The details regarding the last four digits of the user's credit card may be derived from the user data 118 and may be associated with a user account of an e-commerce Website, for example.

The CAPTCHA element 202G contains the enhanced CAPTCHA 208G, which is an enhanced CAPTCHA designed to indirectly ask a question regarding where a user's home is located (e.g., a physical home address associated with a user). In this example, a picture of a house is used to convey the subject of the question being asked. The house picture is shown only for example, and should not be construed as being limiting in any way. However, the house picture may be incorporated into the enhanced CAPTCHA 208G so as to obscure the enhanced CAPTCHA 208G or otherwise make it more difficult for a bot or other automated program from being able to break the enhanced CAPTCHA 208G.

The CAPTCHA element 202H contains the enhanced CAPTCHA 208H, which is an enhanced CAPTCHA designed to indirectly ask a question regarding a user's favorite car (e.g., make, model, or make and model). In this example, a picture of a tire is used to convey the subject of the question being asked. The tire picture is shown only for example, and should not be construed as being limiting in any way. However, the tire picture may be incorporated into the enhanced CAPTCHA 208H in some manner so as to obscure the enhanced CAPTCHA 208H or otherwise make it more difficult for a bot or other automated program from being able to break the enhanced CAPTCHA 208H.

Figure 3:
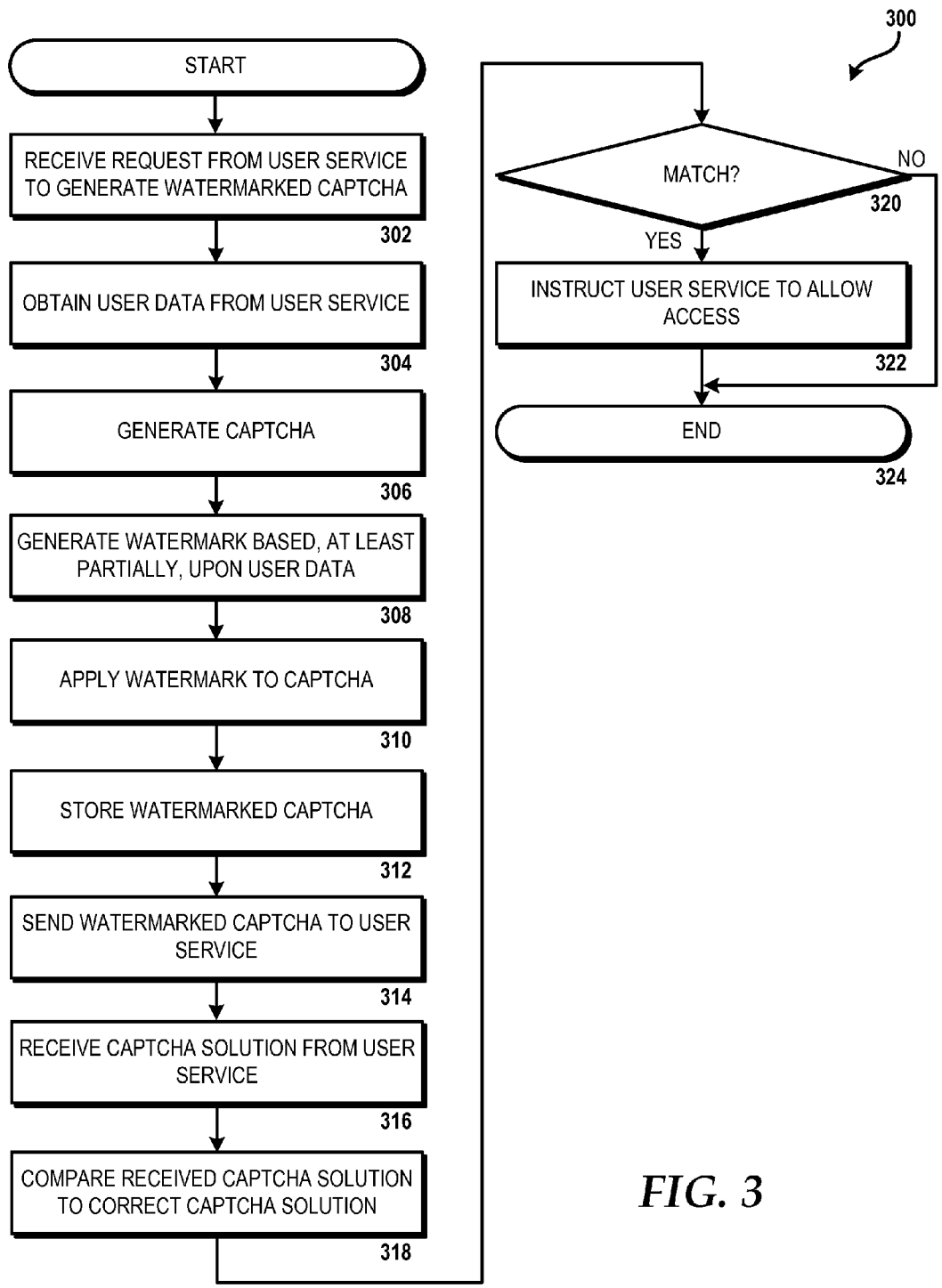
FIG. 3 is a flow diagram showing aspects of a method for providing a CAPTCHA service, according to another illustrative embodiment.
Figure 4:
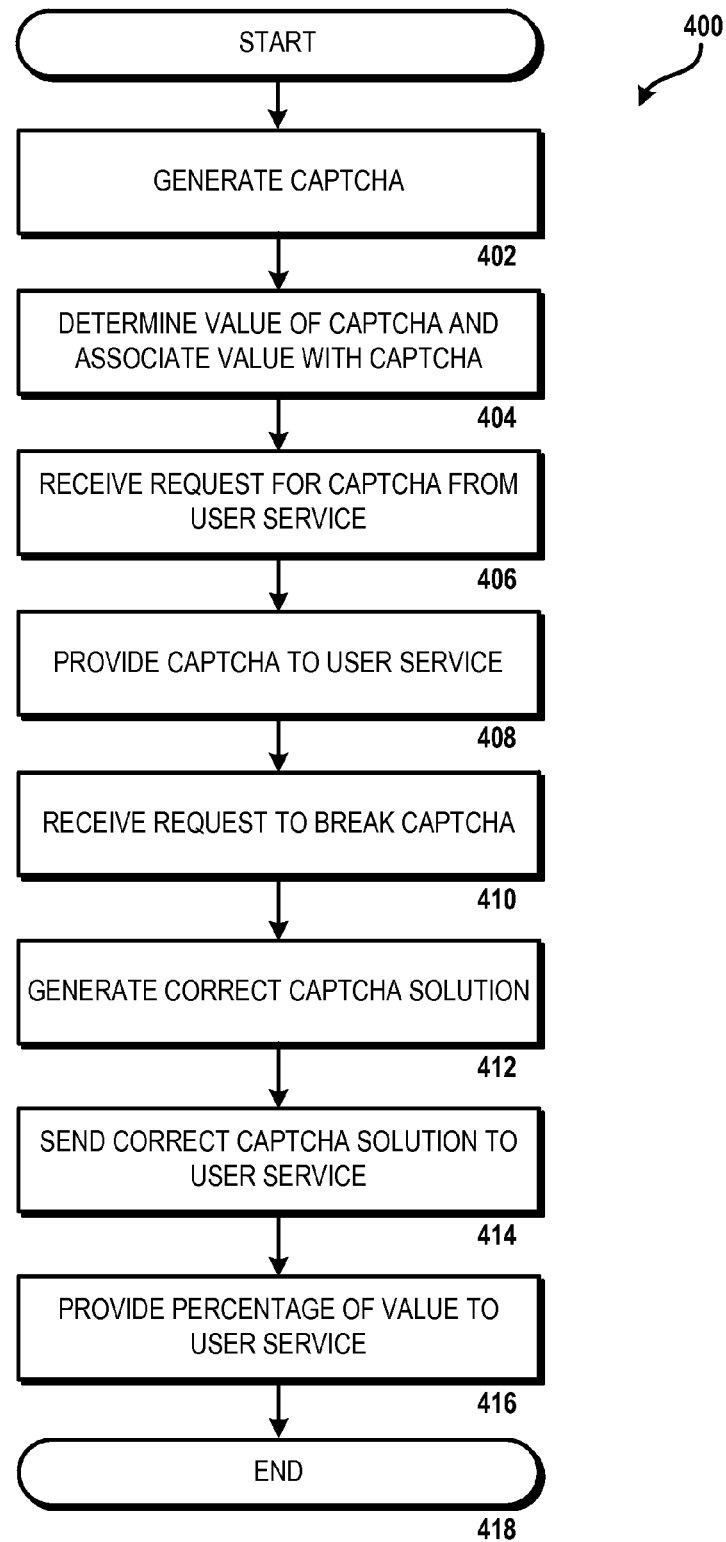
FIG. 4 is a flow diagram showing aspects of a method for providing a CAPTCHA breaking service, according to another illustrative embodiment.

Turning now to FIG. 3, aspects of a method 300 for generating and providing the CAPTCHA service 108 will be described in detail, according to an illustrative embodiment. It should be appreciated that the logical operations described herein with respect to FIG. 3 and FIG. 4 are implemented (1) as a sequence of computer implemented acts or program modules running on a computing system and/or (3) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in FIG. 3 and FIG. 4 described herein. These operations may also be performed in parallel, or in a different order than those described herein.

For purposes of illustrating and describing some of the concepts of the present disclosure, the method 300 is described as being performed by the CAPTCHA service 108, and more particularly, the server computer(s) 120 executing the generate CAPTCHA module 122 and the validate CAPTCHA 124 described herein above. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins at operation 302, where the CAPTCHA service 108 receives a request from the user service 106 to generate a watermarked CAPTCHA. Although the method 300 is described as being particular to a watermarked CAPTCHA, it should be understood that operations of the method 300 may be utilized to generate other enhanced CAPTCHAs as will be explained below.

From operation 302, the method 300 proceeds to operation 304, where the CAPTCHA service 108 obtains at least a portion of the user data 118 from the user service 106. In some embodiments, the CAPTCHA service 108 requests at least the portion of the user data 118 from the user service 106 in response to the request received from the user service 106 at operation 302. In some other embodiments, the user service 106 provides at least the portion of the user data 118 along with the request. In some other embodiments, the user service 106 provides at least the portion of the user data 118 prior to sending the request to generate the watermarked CAPTCHA to the CAPTCHA service 108. In these embodiments, the request can identify at least the portion of the user data 118 that was previously provided to the CAPTCHA service 108.

From operation 304, the method 300 proceeds to operation 306, where the CAPTCHA service 108 generates a CAPTCHA by generating one or more characters. The characters used in the CAPTCHA can be generated randomly. Alternatively, the characters can be generated based upon at least the portion of the user data 118, such as in the examples shown in FIGS. 2C and 2D. Also at operation 306, the CAPTCHA service 108 distorts or otherwise obscures the characters to form the CAPTCHA. Any distortion and/or obscuration technique(s) can be used. It should be understood that, in some implementations, the characters are not distorted or otherwise obscured in any way with the exception of a watermark or other enhancement. The solution to the CAPTCHA might also be generated and/or stored at the time the CAPTCHA service 108 generates the CAPTCHA.

From operation 306, the method 300 proceeds to operation 308, where the CAPTCHA service 108 generates a watermark based, at least partially, upon at least the portion of the user data 118 obtained at operation 304. From operation 308, the method 300 proceeds to operation 310, where the CAPTCHA service 108 applies the watermark to the CAPTCHA generated at operation 306. The watermark can be applied above, below, adjacent to, or embedded within the CAPTCHA or particular characters thereof.

In alternative embodiments, the CAPTCHA service 108 can utilize at least the portion of the user data 118 to generate other enhanced CAPTCHAs instead of watermarked CAPTCHAs. In these alternative embodiments, operation 308 and operation 310 are not performed. In other alternative embodiments, the CAPTCHA service 108 can utilize at least the portion of the user data 118 to generate watermarked CAPTCHAs in addition to other enhanced CAPTCHAs. Combinations of watermarks and other enhancements may be applied to a single CAPTCHA.

From operation 310, the method 300 proceeds to operation 312, where the CAPTCHA service 108 stores the watermarked CAPTCHA in the CAPTCHA storage 128. The CAPTCHA service 108 may also store the correct CAPTCHA solution associated with the watermarked CAPTCHA in the CAPTCHA storage 128.

From operation 312, the method 300 proceeds to operation 314, where the CAPTCHA service 108 sends the watermarked CAPTCHA to the user service 106. The user service 106 can present the watermarked CAPTCHA and receive input of a solution in response. From operation 314, the method 300 proceeds to operation 316, where the CAPTCHA service 108 receives the CAPTCHA solution from the user service 106.

From operation 316, the method 300 proceeds to operation 318, where the CAPTCHA service 108 compares the received CAPTCHA solution to the correct CAPTCHA solution. At operation 320, the CAPTCHA service 108 determines if the received CAPTCHA solution matches the correct CAPTCHA solution. If the CAPTCHA service 108 determines that the received CAPTCHA solution matches the correct CAPTCHA solution, the method 300 proceeds to operation 322, where the CAPTCHA service 108 instructs the user service 106 to allow access. The method 300 then proceeds to operation 324, where the method 300 ends. If the CAPTCHA service 108 determines that the received CAPTCHA solution does not match the correct CAPTCHA solution, the method 300 proceeds to operation 324, where the method 300 ends.

Turning now to FIG. 4, aspects of a method 400 for providing a CAPTCHA breaking service will be described in detail, according to an illustrative embodiment. The method 400 begins at operation 402, where the CAPTCHA service 108 generates a CAPTCHA. From operation 402, the method 400 proceeds to operation 404, where the CAPTCHA service 108 determines a value of the CAPTCHA and associates the value with the CAPTCHA. The CAPTCHA may be stored in association with the value in the CAPTCHA storage 128.

In some embodiments, the value associated with a CAPTCHA might be permitted to fluctuate dynamically based upon various parameters. For example, the value associated with a CAPTCHA might fluctuate dynamically based upon the current processing load on the generate CAPTCHA module 122 and/or the break CAPTCHA module 126. The value might also fluctuate based upon other parameters in other embodiments.

From operation 404, the method 400 proceeds to operation 406, where the CAPTCHA service 108 receives a request for the CAPTCHA from the user service 106. From operation 406, the method 400 proceeds to operation 408, where the CAPTCHA service 108 provides the CAPTCHA to the user service 408 in response to the request. The CAPTCHA service 108 might charge the user service 408 the value computed at operation 404.

From operation 408, the method 400 proceeds to operation 410, where the CAPTCHA service 108 receives a request from the user service 104 to break the CAPTCHA. In some embodiments, the request includes a payment for breaking the CAPTCHA. The payment for breaking the CAPTCHA might be all or a portion of the value of the CAPTCHA computed at operation 404. The request might also contain other types of data.

From operation 410, the method 400 proceeds to operation 412, wherein the CAPTCHA service 108, and more particularly, the break CAPTCHA module 126 generates a correct CAPTCHA solution for the CAPTCHA. As mentioned above, the correct solution to the CAPTCHA might also be generated and/or stored at the time the CAPTCHA service 108 generates the CAPTCHA. The CAPTCHA service 108 might utilize metadata contained in the CAPTCHA 108 or within a watermark in the CAPTCHA 108 during the breaking of the CAPTCHA. The CAPTCHA service 108 then sends the correct CAPTCHA solution to the user service 106 at operation 414.

In some embodiments, the break CAPTCHA module 126 overrides the validate CAPTCHA module 124 to retrieve the correct CAPTCHA solution. In other words, the validate CAPTCHA module 124 may expect a CAPTCHA solution from the user service 106, such as described at operation 316 of the method 300, and instead may receive an override command from the break CAPTCHA module 126 instructing the validate CAPTCHA module 124 to provide the correct CAPTCHA solution to the user service 106.

In some other embodiments, the break CAPTCHA module 126 provides or utilizes a CAPTCHA breaking service to break the CAPTCHA. The CAPTCHA breaking service, in some embodiments, is provided by a crowdsourcing marketplace that utilizes human intelligence to perform tasks. The humans that perform tasks for the crowdsourcing marketplace may be compensated directly by the CAPTCHA service 108, indirectly by the CAPTCHA service 108 through the crowdsourcing marketplace, or in some other manner.

From operation 414, the method 400 proceeds to operation 416, where the CAPTCHA service 108 provides to the user service 108 all or a percentage of the value associated with the CAPTCHA. The CAPTCHA service 108 can provide the percentage via an electronic transaction or any other means. From operation 416, the method 400 proceeds to operation 418, where the method 400 ends.

Figure 5:
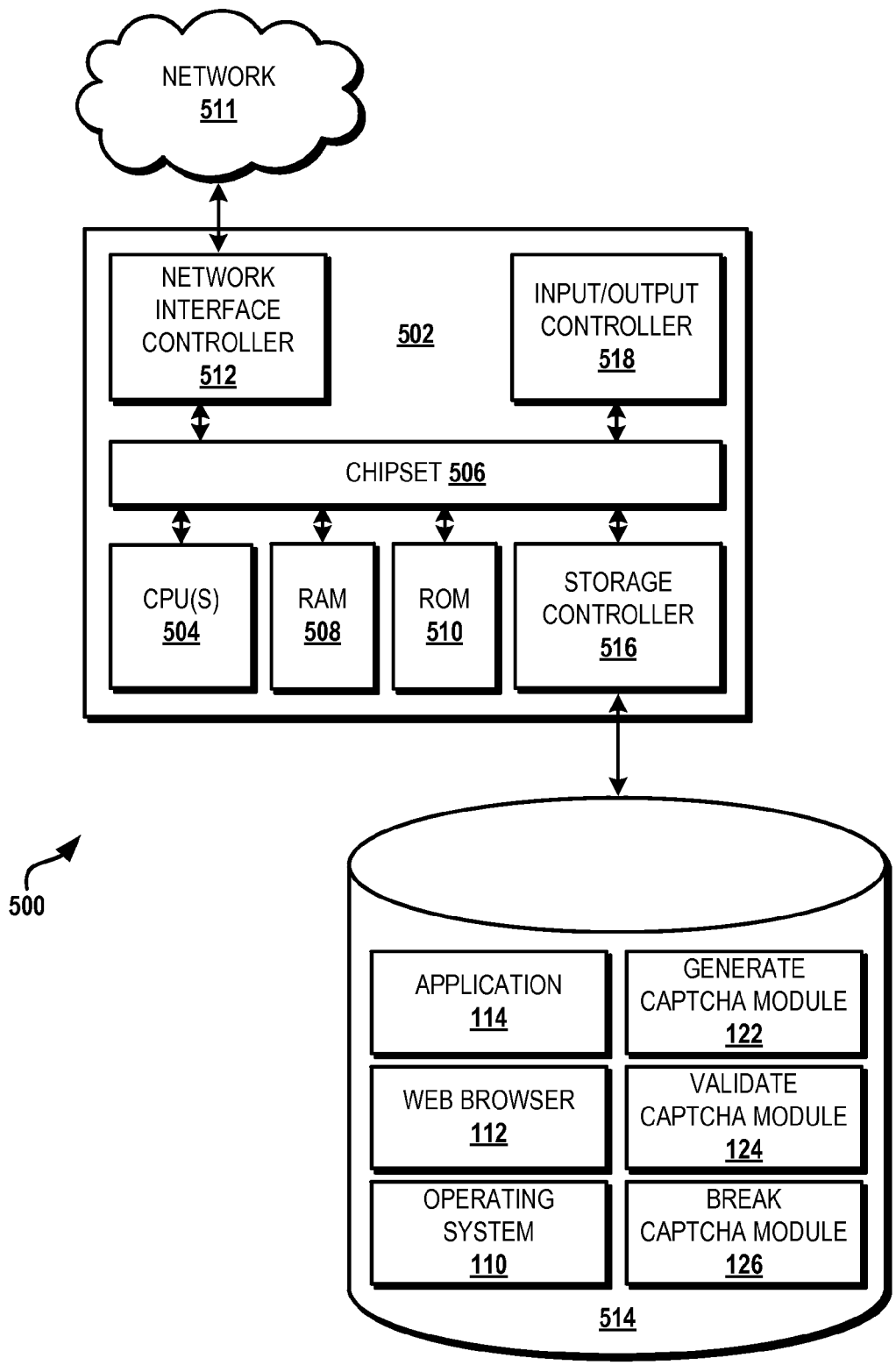
FIG. 5 is a computer architecture diagram showing one illustrative computer hardware architecture for use in computing devices configured to implement the concepts and technologies disclosed herein in one embodiment.

FIG. 5 shows an example computer architecture for a computer 500 capable of executing the program components described above for generating and providing enhanced CAPTCHAs and providing a CAPTCHA breaking service. The computer architecture shown in FIG. 5 illustrates a conventional server computer, workstation, desktop computer, laptop, tablet, network appliance, PDA, e-book reader, digital cellular phone, or other computing device, and may be utilized to execute any aspects of the software components presented herein described as executing on the computing system 102, on the server computers 120, or on any other computing system executing as part of user service 106 or the CAPTCHA service 108, or as otherwise mentioned herein.

The computer 500 includes a baseboard 502, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 504 may be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a random access memory ("RAM") 508, used as the main memory in the computer 500. The chipset 506 may further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM may also store other software components necessary for the operation of the computer 500 in accordance with the embodiments described herein.

The computer 500 may operate in a networked environment using logical connections to remote computing devices and computer systems through a network 511, such as the network 104. The chipset 506 may include functionality for providing network connectivity through a network interface controller ("NIC") 512, such as a gigabit Ethernet adapter. The NIC 512 is capable of connecting the computer 500 to other computing devices over the network 511. It should be appreciated that multiple NICs 512 may be present in the computer 500, connecting the computer to other types of networks and remote computer systems.

The computer 500 may be connected to a mass storage device 514 that provides non-volatile storage for the computer. The mass storage device 514 may store system programs, application programs, other program modules, and data, which have been described in greater detail herein. The mass storage device 514 may be connected to the computer 500 through a storage controller 516 connected to the chipset 506. The mass storage device 514 may consist of one or more physical storage units. The storage controller 516 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 514 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 514 is characterized as primary or secondary storage, and the like.

For example, the computer 500 may store information to the mass storage device 514 by issuing instructions through the storage controller 516 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 514 by detecting the physical states or characteristics of one or more particular locations within the physical storage units.

In addition to the mass storage device 514 described above, the computer 500 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 514 may store an operating system, such as the operating system 110, utilized to control the operation of the computer 500. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 514 may store other system or application programs and data utilized by the computer 500, such as the Web browser 112, the application 114, the generate CAPTCHA module 122, the validate CAPTCHA module 124, the break CAPTCHA module 126, and/or any of the other software components and data described herein above. The mass storage device 514 might also store the user data 118, the CAPTCHA service module 116, the standard CAPTCHA(s) 130, the watermarked CAPTCHA(s) 132, the other enhanced CAPTCHA(s) 134, and/or other programs and/or data not specifically identified herein.

In one embodiment, the mass storage device 514 or other computer-readable storage media is encoded with computer-executable instructions which, when loaded into the computer 500, transforms the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the methods described above with regard to FIG. 3 and FIG. 4.

The computer 500 may also include one or more input/output controllers 518 for receiving and processing input from a number of input devices, such as a keyboard, a mouse, a touchpad, a touch screen, an electronic stylus, or other type of input device. Similarly, the input/output controller 518 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for generating and providing enhanced CAPTCHAs and providing a CAPTCHA breaking service have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a Completely Automated Public Turing test to Tell Computers and Humans Apart ("CAPTCHA"), the computer-implemented method comprising performing computer-implemented operations for:
   receiving a request to generate a CAPTCHA;
   obtaining user data comprising personally identifiable information;
   generating the CAPTCHA based, at least partially, upon the obtained user data, wherein the generated CAPTCHA contains a question indirectly asked regarding the personally identifiable information;
   transmitting the CAPTCHA in response to the request;
   receiving a CAPTCHA solution for the CAPTCHA;
   comparing the CAPTCHA solution for the CAPTCHA to a correct solution for the CAPTCHA, the correct solution comprising an answer to the question contained in the generated CAPTCHA;
   determining, based upon the comparison, that the received CAPTCHA solution for the CAPTCHA matches the correct solution for the CAPTCHA; and
   causing access to a service to be provided in response to determining that the received CAPTCHA solution for the CAPTCHA matches the correct solution for the CAPTCHA.

2. The computer-implemented method of claim 1, wherein the personally identifiable information is selected such that a user knowing the personally identifiable information is more likely to provide a correct solution to the CAPTCHA than a user that does not know the personally identifiable information.

3. The computer-implemented method of claim 1, wherein the correct solution to the CAPTCHA is sent with the CAPTCHA.

4. The computer-implemented method of claim 1, wherein the generated CAPTCHA is a watermarked CAPTCHA.

5. The computer-implemented method of claim 4, wherein the watermarked CAPTCHA is generated by overlaying a watermark enhancement on a CAPTCHA or at least one character of the CAPTCHA, positioning the watermark enhancement above, below, or adjacent to the CAPTCHA or at least one character of the CAPTCHA, or embedding the watermark enhancement within the CAPTCHA or at least one character of the CAPTCHA.

6. The computer-implemented method of claim 4, wherein the CAPTCHA comprises an invisible watermark including data for consumption by a break CAPTCHA module.

7. The computer-implemented method of claim 6, wherein the invisible watermark comprises the user data.

8. The computer-implemented method of claim 1, wherein the question indirectly asked is presented by using an image to represent an object asked in the question.

9. A non-transitory computer-readable storage medium for providing a Completely Automated Public Turing test to Tell Computers and Humans Apart ("CAPTCHA"), having computer-executable instructions stored thereupon which, when executed by a computer, cause the computer to:
   receive a request to access a service;
   in response to receiving the request to access the service, transmit a request to a CAPTCHA service for a CAPTCHA, the request for the CAPTCHA comprising user data to be incorporated in the CAPTCHA, the user data comprising personally identifiable information;
   receive the CAPTCHA in response to the request, the CAPTCHA being generated based, at least in part, upon the user data and containing an implied question regarding the personally identifiable information without being presented in a form of question;
present the received CAPTCHA;
receive a solution to the CAPTCHA;
determine that the received solution to the CAPTCHA matches a correct solution to the CAPTCHA, the correct solution comprising an answer to the implied question contained in the received CAPTCHA; and
provide access to the service in response to determining that the received solution to the CAPTCHA matches the correct solution to the CAPTCHA.

10. The computer-readable storage medium of claim 9, wherein the correct solution to the CAPTCHA is received with the CAPTCHA.

11. The computer-readable storage medium of claim 9, wherein the personally identifiable information about the user is selected such that the user is more likely to provide a correct solution to the CAPTCHA than another user that does not know the personally identifiable information.

12. The computer-readable storage medium of claim 9, wherein the generated CAPTCHA is a watermarked CAPTCHA.

13. The computer-readable storage medium of claim 12, wherein the watermarked CAPTCHA includes an invisible watermark containing the user data.

14. The computer-readable storage medium of claim 12, wherein the user data is contained in a visible portion of the watermarked CAPTCHA.

15. The computer-readable storage medium of claim 9, wherein the implied question is presented by using an image to represent an object asked in the implied question.

16. A computer-implemented method, for providing a Completely Automated Public Turing test to Tell Computers and Humans Apart ("CAPTCHA"), comprising performing computer-implemented operations for:
receiving a request to access a service;
in response to receiving the request to access the service, transmitting a request to a CAPTCHA service for a CAPTCHA,
the request for the CAPTCHA comprising user data to be incorporated in the CAPTCHA, the user data comprising personally identifiable information;
receiving the CAPTCHA in response to the request, the CAPTCHA being generated based, at least partially, upon the user data and containing an implied question regarding the personally identifiable information without being presented in a form of question, wherein a correct solution to the generated CAPTCHA comprises an answer to the implied question contained in the generated CAPTCHA;
presenting the received CAPTCHA;
receiving a solution to the CAPTCHA;
determining that the received solution to the CAPTCHA matches a correct solution to the CAPTCHA; and
causing access to the service to be provided in response to determining that the received solution to the CAPTCHA matches the correct solution to the CAPTCHA.

17. The computer-implemented method of claim 16, wherein the personally identifiable information is selected such that a user knowing the personally identifiable information is more likely to provide a correct solution to the CAPTCHA than a user that does not know the personally identifiable information.

18. The computer-implemented method of claim 16, wherein the user data is contained in a visible portion of the CAPTCHA.

19. The computer-implemented method of claim 16, wherein the user data is contained in an invisible portion of the CAPTCHA.

20. The computer-implemented method of claim 16, wherein the CAPTCHA comprises metadata containing a value associated with the CAPTCHA.

21. The computer-implemented method of claim 16, wherein the CAPTCHA comprises metadata for consumption by a break CAPTCHA module.

22. The computer-implemented method of claim 16, wherein the correct solution for the CAPTCHA is received with the CAPTCHA.

23. A system for creating a Completely Automated Public Turing test to Tell Computers and Humans Apart ("CAPTCHA") comprising one or more computing devices that comprise:
one or more processors; and
one or more non-transitory computer-readable storage media having computer executable instructions stored thereon which, when executed by the one or more processors, cause the one or more computing devices to
receive a request for a CAPTCHA,
receive user data comprising personally identifiable information,
generate a CAPTCHA based, at least partially, upon the user data, wherein the generated CAPTCHA contains an implied question regarding the personally identifiable information without being presented in a form of question, and wherein a correct solution to the CAPTCHA comprises an answer to the implied question contained in the CAPTCHA, and
send the CAPTCHA in response to the request,
receive a CAPTCHA solution for the CAPTCHA,
compare the CAPTCHA solution for the CAPTCHA to the correct solution to the CAPTCHA,
determine, based upon the comparison, that the received CAPTCHA solution for the CAPTCHA matches the correct solution to the CAPTCHA, and
cause access to a service to be provided in response to determining that the received CAPTCHA solution for the CAPTCHA matches the correct solution to the CAPTCHA.

24. The system of claim 23, wherein the personally identifiable information is selected such that a user knowing the personally identifiable information is more likely to provide a correct solution to the CAPTCHA than a user that does not know the personally identifiable information.

25. The system of claim 23, wherein the user data is contained in a visible portion of the CAPTCHA.

26. The system of claim 23, wherein the user data is contained in an invisible portion of the CAPTCHA.

27. The system of claim 23, wherein the CAPTCHA comprises metadata containing a value associated with the CAPTCHA.

28. The system of claim 23, wherein the CAPTCHA comprises metadata for consumption by a break CAPTCHA module.

29. The system of claim 23, wherein the correct solution for the CAPTCHA is sent with the CAPTCHA in response to the request.

30. The system of claim 23, wherein the generated CAPTCHA is a watermarked CAPTCHA.

31. The system of claim 23, wherein the implied question is presented by using an image to represent an object asked in the implied question.

* * * * *